(12) United States Patent
Allison et al.

(10) Patent No.: US 6,344,498 B1
(45) Date of Patent: Feb. 5, 2002

(54) ERASABLE MARKING COMPOSITION

(75) Inventors: Keith J. Allison, Blandon; Richard J. Kaiser, Allentown, both of PA (US)

(73) Assignee: Binney & Smith, Inc., Easton, PA (US)

( * ) Notice: Subject to any disclaimer, the term of this patent is extended or adjusted under 35 U.S.C. 154(b) by 0 days.

(21) Appl. No.: 09/536,054

(22) Filed: Mar. 27, 2000

(51) Int. Cl.[7] .................. C09D 11/18; C08L 75/04; B43K 5/02
(52) U.S. Cl. .................. 523/161; 524/590; 401/209
(58) Field of Search .................. 523/160, 161; 106/316, 31.64, 31.89; 524/589, 590; 401/209

(56) References Cited

U.S. PATENT DOCUMENTS

| | | |
|---|---|---|
| 3,894,976 A | 7/1975 | Kang et al. |
| 4,244,862 A | 1/1981 | Handa et al. |
| 4,422,670 A | 12/1983 | Hasegawa et al. |
| 4,596,846 A | 6/1986 | Bohne et al. |
| 4,686,260 A | 8/1987 | Lindemann et al. |
| 4,940,628 A | 7/1990 | Lin et al. |
| 4,988,123 A | 1/1991 | Lin et al. |
| 5,024,898 A | 6/1991 | Pitts et al. |
| 5,100,471 A | 3/1992 | Winnik et al. |
| 5,158,606 A | 10/1992 | Carlick et al. |
| 5,160,369 A | 11/1992 | Parkinson et al. |
| 5,217,255 A | 6/1993 | Lin et al. |
| 5,336,306 A | 8/1994 | Hughes et al. |
| 5,338,793 A | 8/1994 | Loftin |
| 5,364,702 A | 11/1994 | Idei et al. |
| 5,389,717 A | 2/1995 | Santini et al. |
| 5,412,021 A * | 5/1995 | Nakanishi .................. 524/523 |
| 5,466,281 A * | 11/1995 | Hanke et al. ............ 106/31.38 |
| 5,561,175 A | 10/1996 | Imagawa |
| 5,569,707 A | 10/1996 | Blum et al. |
| 5,587,408 A | 12/1996 | Burns et al. |
| 5,599,853 A | 2/1997 | Loftin |
| 5,637,638 A | 6/1997 | Chandler et al. |
| 5,661,197 A | 8/1997 | Villiger et al. |
| 5,677,363 A | 10/1997 | Imagawa |
| 5,712,328 A * | 1/1998 | Inoue et al. ................ 523/161 |
| 5,716,217 A * | 2/1998 | Imagawa et al. ........... 434/408 |
| 5,852,072 A | 12/1998 | Banning et al. |
| 5,852,073 A | 12/1998 | Villiger et al. |
| 5,854,320 A * | 12/1998 | Nakamura et al. ........... 524/48 |
| 6,048,914 A * | 4/2000 | Goto et al. ................ 523/161 |

FOREIGN PATENT DOCUMENTS

| | | |
|---|---|---|
| EP | 0 322 805 A2 | 7/1989 |
| GB | 2 116 193 A | 9/1983 |

* cited by examiner

*Primary Examiner*—Vasu Jagannathan
*Assistant Examiner*—Callie E. Shosho
(74) *Attorney, Agent, or Firm*—Ratner & Prestia

(57) ABSTRACT

A water-based, erasable marking composition comprising 1–86% by weight water, 0.3–38% by weight pigment, 13–45% by weight polyurethane, and 0–85% by weight glycerin. The present invention also includes an application instrument comprising an outer body having a first end, an applicator at the first end of the outer body, a reservoir included within the outer body and in fluid communication with the applicator, and a water-based, erasable marking composition within the reservoir. The water-based, erasable marking composition comprises the composition of the invention.

14 Claims, No Drawings

ERASABLE MARKING COMPOSITION

FIELD OF INVENTION

This invention relates generally to erasable marking compositions, and more specifically, to water-based, erasable marking compositions containing polyurethane.

BACKGROUND OF INVENTION

It is often desirable to produce ink images from a pen, marker, printer, or other application device which can be readily removed or erased. Typical among these inks were compositions comprising a pigment and a liquid carrier or binder in which the pigment was dispersed. A common water-based erasable ink contained pigment in conjunction with styrene butadiene rubber (SBR) emulsions to provide erasability.

Some typical SBR based inks are disclosed in U.S. Pat. No. 5,389,717 to Santini et al., U.S. Pat. No. 5,599,853 to Loftin, U.S. Pat. No. 4,686,260 to Lindemann et al., and U.S. Pat. No. 4,596,846 to Bohne et al.

SBR based inks, however, had drawbacks. SBR based inks often became permanent over time as oxidation caused crosslinking to occur within the composition after it was applied to a substrate. It was observed that as this crosslinking occurred over time, the erasability of the SBR based ink diminished. With enough time (on the order of weeks), the SBR based ink often became essentially unerasable.

Another potential drawback was that SBR based inks, when first applied, were actually too erasable—meaning they smeared and were easily accidentally removed from the paper or surface to which they were applied. These inks also often formed a build-up on the writing nib (e.g. pen point) which usually resulted in an undesirable and unclean writing nib which would smear and apply ink unevenly.

One potential solution to the nib build-up problem was addressed through the use of expensive shaker balls and valve systems. These, although partially improving upon the nib build-up problem, were expensive and still did not solve the other problems.

Solutions were sought to the above problems and included the introduction of antioxidants into the ink composition to prevent oxidation, subsequent crosslinking, and the resultant undesirable impact on erasability. The introduction of these antioxidants extended the period of time one had to erase the ink, but even then often only out to about one month from the time of application.

Attempts have been made to add glycerin to the SBR inks in order to prevent build-up of the ink on the writing nib. The introduction of glycerin was seen, however, to negatively impact the ink erasability and often made the erasure very dirty and left visually unpleasant smudges and smears.

Still other attempts have involved the use of certain inks in combination with specialized surfaces in order to achieve some degree of erasability. Such combinations are disclosed in, for example, U.S. Pat. No. 5,217,255 to Lin et al., U.S. Pat. No. 4,940,628 to Lin et al., and U.S. Pat. No. 4,988,123 to Lin et al. These patents all require that the inks disclosed as erasable be used with certain writing surfaces so as to be erasable. U.S. Pat. No. 5,217,255, for example, teaches that the ink, in order to be satisfactorily erasable, be applied to a surface having an average pore diameter of between about 0.05 and 1.0 microns. Where the substrate does not have such an average pore diameter, it can be treated in order to achieve that range of porosity. Thus, these patents teach ink/substrate systems which provide a degree of erasability.

The drawbacks discussed above suggest the need for a water-based composition that flows well through the writing nib (in the case where the composition is to be used in a pen or marker), does not easily smudge, but which is easily and effectively erased from any surface to which it is applied. Another desirable aspect to such an improved composition would be the length of time it remains easily and effectively erasable after it is initially applied.

SUMMARY OF INVENTION

The present invention provides a water-based, erasable marking composition comprising water, pigment, glycerin, and polyurethane. The composition may optionally include a surfactant. The ink composition of the present invention is a water-based ink composition that flows well through the writing nib (in the case where the composition is to be used in a pen or marker), does not easily smudge, is easily and effectively erased from the surface to which it is applied, and remains easily and effectively erasable from the surface to which it is applied for an indefinite length of time after it is initially applied to that surface. Also included in the present invention is an application instrument that uses the erasable composition of the present invention.

The water-based, erasable marking composition comprises 1–86% by weight water, 0.3–38% by weight pigment, 13–45% by weight polyurethane, and 0–85% by weight glycerin. The composition optionally includes surfactants and anti-microbial preservatives. The preferred surfactant is a fluorosurfactant.

A more preferred embodiment comprises 13–69% by weight water, 5–15% by weight glycerin, 0.3–6% by weight pigment, and 26–42.5% by weight polyurethane.

The most preferred embodiment comprises 52% by weight water, 9% by weight glycerin, 4% by weight pigment, and 35% by weight polyurethane.

The invention also includes an application instrument comprising an outer body, an applicator, a reservoir included within the outer body and in fluid communication with the applicator, and a water-based, erasable marking composition within the reservoir. The water-based, erasable marking composition is that disclosed herein.

DETAILED DESCRIPTION OF INVENTION

The present invention provides an erasable composition, typically for use as an ink in a pen or marker (but having other applications, such as for use as a paint or in a printer cartridge), comprising an aqueous dispersion of a polyurethane elastomer and colorant. More specifically, the present invention provides a water-based, erasable marking composition comprising water, pigment, glycerin, and polyurethane. The water-based, erasable marking composition generally comprises 1–86% by weight water, 0.3–38% by weight pigment, 13–45% by weight polyurethane, and 0–85% by weight glycerin. The composition may optionally include a surfactant to aid in flowability. The preferred surfactant is a fluorosurfactant. The composition may also optionally include anti-microbial preservatives.

The inventors believe that the composition of the present invention forms a film on a suitable surface (such as a writing surface or substrate) to which it is applied (e.g. paper or whiteboard) that is strongly cohesive and minimally adhesive. The difference between cohesive and adhesive is understood by one skilled in the art. Generally, however, the more the composition adheres to the surface to which it is applied, the less easily that composition can be erased. In the case of the present invention, when the composition is erased, the film is removed in large sections because of the cohesive nature of the polyurethane within the film. This phenomenon produces a clean erasure.

It should be noted that for purposes of this disclosure, the word "erase" has its normal meaning. This would include the use of a piece of rubber, such as a pencil eraser, to rub the composition after it is applied to a surface, such as a piece of paper.

Although benefiting from the forming of the polyurethane film and the resultant cohesive properties associated with that film, the composition of the present invention also is more adhesive than traditional SBR-based inks. The presence of some adhesive qualities in the composition of the present invention decreases accidental removal and smudging when the composition is first applied.

This cohesive nature of the composition of the present invention, coupled with its display of suitable adhesiveness, means it can be applied cleanly and evenly, yet stay erasable for an indefinite period of time after it has been applied to a surface. Thus, although many SBR based inks become permanent after crosslinking occurs (a matter of only days or even hours), the composition of the present invention stays erasable indefinitely.

An optional element of the composition according to the present invention is a surfactant. The addition of a surfactant aids in the wetting of the applicator (whether it be a pen tip such as a ballpoint nib or felt tip nib, or a paint brush, or any number of other applicators). By wetting, it is meant that the composition will attach to the surface of the applicator, be it bristles of a brush, a metal ball, or polyester fibers. Good wetability means the composition will attach to the applicator and be delivered to the surface to which the user desires to apply the composition. If the applicator is not adequately wetted, the composition will not flow evenly onto the surface. A preferred surfactant is a fluorosurfactant, and the preferred fluorosurfactants are disclosed below in the several examples.

It should be noted that too much surfactant may affect the erasability of the composition. If too much surfactant is added, the composition can soak into the surface (in the case, for example, where porous paper is the surface to which the composition is applied) and become more difficult to erase. The inventors have disclosed herein the range of acceptable surfactant content to balance the need to wet the applicator against the detrimental decrease in erasability. A preferred amount of fluorosurfactant is from 0–1% by weight, and a more preferred amount is from 0.002–0.375% by weight.

Typically, the viscosity of the composition of the present invention is less than 20 centipoise when the composition is used as an ink. Higher viscosities are preferred where appropriate, such as when the composition is used as a paint.

Tap water may be used as the source of water added to the composition. Deionized water is preferred in most cases, however, because with increased presence of ions in the composition comes a decrease in stability. Moreover, ions can disrupt the dispersion of the pigment within the composition, leading to a loss of good dispersion and uneven color distribution within the composition, among other problems.

The erasability of the composition of the present invention depends upon both the exact make-up of the composition used and the surface to which it is applied. Where lower amounts of polyurethane are present, erasability generally is not as good as where higher amounts are used. The surface to which the composition is applied, however, also affects the erasability. The acceptable ranges for the components of the present invention were calculated based on a minimum acceptable erasability of 50% on typical types of paper. That is to say, where at least 50% of the applied mark is erased, the composition is considered erasable. Of course, the closer one gets to 100%, the more erasable the composition. As stated above, erasability depends on both the composition make up itself, and also the surface to which it is applied.

Tests were conducted to find the acceptable ranges of components for the compositions according to the invention. For each composition, the percent erasability was determined. The percent erasability was defined using the L value for the plain paper, the mark itself, and the erased mark, where the erasure was made using a typical eraser applied by hand to the mark. The L value is defined as the "whiteness" or "lightness" in accordance with a standard developed by the Commission Internationale de L'Éclairage (CIE) to measure whiteness. It is a part of the CIE's L*A*B* standard, and is well known to those skilled in the art. In this case, an X-Rite spectrophotometer was used. (X-RITE is a registered trademark of Foresight Enterprises, Inc. of Grand Rapids, Mich.)

The percent erasability is defined as:

% erasability $(L_{mark} - L_{erased\ mark})/L_{mark}$.

This number can also be thought of as the percent change in L value between the mark and the erased mark, where the percent change in L value between the mark and the erased mark is the erasability.

Table 1 sets forth values for % erasability as defined above for the most preferred composition of the present invention for three different types of paper. The formulations used for each color are provided below in Tables 4–11. The three types of paper tested were: #1 Watermarked White, 20 lb Hammermill Bond Paper (bond paper); GreenCycle Ampad Wide-Ruled White (tablet paper); and Georgia-Pacific Spectrum DP Paper (copier paper).

TABLE 1

| Ink Color | Bond Paper | College-Ruled Tablet Paper | Copier Paper |
| --- | --- | --- | --- |
| Black | 88.8% | 91.5% | 84.7% |
| Violet | 90.6% | 93.6% | 97.2% |
| Blue | 88.4% | 93.6% | 88.5% |
| Green | 91.3% | 95.1% | 90.2% |
| Red | 91.3% | 93.2% | 88.4% |
| Orange | 91.0% | 95.3% | 88.4% |
| Yellow | 88.3% | 92.2% | 84.0% |
| Brown | 90.5% | 94.1% | 89.6% |

Additional experimentation was performed in order to ascertain the advantages of the inks of the present invention. Several ink formulations, Including the inks of U.S. Pat. No. 5,217,255 to Lin et al., as well as modifications thereof, were tested and compared to the inks of the current invention. When the ink formulation of Example 2 of U.S. Pat. No. 5,217,255 was generated, it was discovered that it would not flow through a typical marker tip. Consequently, the inks were applied to the papers tested via a drawdown bar (3 mil) which delivered a three thousandths of an inch thick layer of ink onto each paper type.

COMPARATIVE EXAMPLE 1

The first comparative ink composition tested comprised 60.8% by weight polymeric film-forming material, namely, styrene-butadiene latex, supplied by Goodyear Tire and Rubber Company, 2.0% by weight potassium oleate, 0.2% by weight benzotriazole, 5.0% by weight glycerine, 5.0% by weight ethylene glycol, 1.5% by weight pigment (Colanyl Blue A2R, sold by American Hoechst), and 25.92% by weight water. This is essentially Example 2 from U.S. Pat. No. 5,217,255 to Lin et al. The results of % erasability testing (as defined above) are provided in Table 2.

COMPARATIVE EXAMPLE 2

The second comparative ink composition tested comprised 54.5% by weight water, 9% by weight glycerin, 1.5% by weight pigment, and 35% by weight polyurethane. This composition is essentially the preferred composition of the present invention, with the exception that only 1.5% by weight pigment was used, as in Comparative Example 1 (still Colanyl Blue). The results of % erasability testing (as defined above) are provided in Table 2.

COMPARATIVE EXAMPLE 3

The third comparative ink composition tested was comprised of the same materials and amounts as recited in Comparative Example 2, except that the pigment used was a blue pigment, provided commercially as HOSTAFINE (a registered trademark of Hoechst Aktiengesellschaft for pigments). The results of % erasability testing (as defined above) are provided in Table 2.

COMPARATIVE EXAMPLE 4

The fourth comparative ink composition tested comprised 45% by weight polymeric film-forming material, namely, styrene-butadiene latex, supplied by Goodyear Tire and Rubber Company, 2.0% by weight potassium oleate, 0.2% by weight benzotriazole, 5.0% by weight glycerine, 5.0% by weight ethylene glycol, 1.5% by weight pigment (Colanyl Blue A2R, sold by American Hoechst), and 41.3% by weight water. This composition is essentially the same as that of Comparative Example 1, except for less polymeric film-forming material, and more water. The results of % erasability testing (as defined above) are provided in Table 2.

TABLE 2

| Comparative Example | Bond Paper | College-Ruled Tablet Paper | Copier Paper |
|---|---|---|---|
| 1 | 92.9% | 76.2% | 88.2% |
| 2 | 92.3% | 93.3% | 90.4% |
| 3 | 93.3% | 93.0% | 90.2% |
| 4 | 69.7% | 61.8% | 57.2% |

As can be seen through an examination of the data presented in Table 2, the inks of Comparative Examples 2 and 3 (essentially the compositions according to the present invention) produced superior results in generally all cases when compared to the inks of examples 1 and 4 (generally compositions according to the prior art). Indeed, the best inks were seen in Comparative Examples 2 and 3, which are essentially the inks of the present invention with the exception of slightly less pigment. The only difference between Comparative Examples 2 and 3 was that different pigments were used.

The composition of the present invention also works, however, for compositions which vary from the preferred composition. As addressed above, the acceptable ranges for the components of the present invention were calculated based on a minimum acceptable erasability of 50%. That is to say, where at least 50% of the applied mark is erased, the composition is considered erasable. Extending this definition to an analysis utilizing ΔL values, it can be seen that where the L value decreases by at least 50% when a mark is erased, that mark is considered erasable.

Table 3 presents data showing L values for three different black compositions, both before and after each mark is erased. Table 3 also shows the calculated % erasability for the black mark on three different types of surfaces—three different types of paper. For each type of paper, the paper itself was defined to have an L value of zero.

TABLE 3

| | L value of mark | L value of erased mark | % change in L value ($L_{mark}$-$L_{erased\ mark}$)/$L_{mark}$ (Erasability) |
|---|---|---|---|
| Black #1 on Bond Paper: 3% pigment 5% polyurethane 83% DI water 9% glycerin | −41.91 | −22.86 | 45% |
| Black #2 on college-ruled notebook paper: 3% pigment 12.5% polyurethane 75.5% DI water 9% glycerin | −41.46 | −18.68 | 55% |
| Black #3 on copier paper: 3% pigment 6% polyurethane 82% DI water 9% glycerin | −39.01 | −19.24 | 51% |

As can be seen from above, depending upon the surface to which the composition is applied, the polyurethane content may or may not be enough to insure good erasability. Thus, the minimum amount of polyurethane required was determined from an examination of the most porous paper—the college-ruled tablet paper. This amount of polyurethane will provide that the ink of the present invention will show good erasability no matter what type of paper is used.

A preferred composition according to the present invention comprises 13–69% by weight water, 5–15% by weight glycerin, 0.3–6% by weight pigment, and 26–42.5% by weight polyurethane. Although preferred where wetability is a problem, a surfactant is not always required to achieve good application of the composition of the present invention.

The following tables illustrate a specific embodiment of the present invention for eight different colored ink compositions. Values given are in weight percent of the particular component added to the system. It should be noted, however, that in some cases, the total amount of a particular component in the system may be slightly higher or lower than the amount shown for each component in the table. For example, because there is some water present in the pigment added, the pigment addition will add some water to the overall system. Particular specifications for each of the components are presented below in Tables 4–1, and will allow one skilled in the art to calculate the exact compositional makeup.

TABLE 4

BLACK

| | |
|---|---|
| Water | 51.78 |
| Polyurethane resin | 35.00 |
| Glycerin | 9.00 |
| FC-120 | 0.08 |
| Hostafine Black T (Pigment) | 3.75 |
| Proxel BZ | 0.39 |
| TOTAL | 100.00 |

TABLE 5

VIOLET

| | |
|---|---|
| Water | 51.77 |
| Polyurethane resin | 35.00 |
| Glycerin | 9.00 |
| FC-120 | 0.08 |
| Hostatine Rubine | 3.28 |
| Hostafine Blue B2G | 0.48 |
| Proxel BZ | 0.39 |
| TOTAL | 100.00 |

TABLE 6

BLUE

| | |
|---|---|
| Water | 51.77 |
| Polyurethane resin | 35.00 |
| Glycerin | 9.00 |
| FC-120 | 0.08 |
| Hostafine Rubine | 0.48 |
| Hostafine Blue B2G | 3.28 |
| Proxel BZ | 0.39 |
| TOTAL | 100.00 |

TABLE 7

GREEN

| | |
|---|---|
| Water | 51.78 |
| Polyurethane resin | 35.00 |
| Glycerin | 9.00 |
| FC-120 | 0.08 |
| Hostafine Yellow Green | 0.94 |
| Green GN | 2.81 |
| Proxel BZ | 0.39 |
| TOTAL | 100.00 |

TABLE 8

RED

| | |
|---|---|
| Water | 51.78 |
| Polyurethane resin | 35.00 |
| Glycerin | 9.00 |
| FC-120 | 0.08 |
| Hostafine Rubine F6B | 2.81 |
| Hostafine Yellow Hr | 0.94 |
| Proxel BZ | 0.39 |
| TOTAL | 100.00 |

TABLE 9

ORANGE

| | |
|---|---|
| Water | 51.77 |
| Polyurethane resin | 35.00 |
| Glycerin | 9.00 |
| FC-120 | 0.08 |
| Hostafine Red HF3S | 2.52 |
| Hostafine Yellow Green | 1.24 |
| Proxel BZ | 0.39 |
| TOTAL | 100.00 |

TABLE 10

YELLOW

| | |
|---|---|
| Water | 51.78 |
| Polyurethane resin | 35.00 |
| Glycerin | 9.00 |
| FC-120 | 0.08 |
| Hostafine Yellow Green | 3.75 |
| Proxel BZ | 0.39 |
| TOTAL | 100.00 |

TABLE 11

BROWN

| | |
|---|---|
| Water | 51.73 |
| Polyurethane resin | 35.00 |
| Glycerin | 9.00 |
| FC-120 | 0.08 |
| Hostafine Rubine F6B | 1.55 |
| Hostafine Blue | 0.24 |
| Hostafine Yellow Hr | 2.01 |
| Proxel BZ | 0.39 |
| TOTAL | 100.00 |

Suitable polyurethane resins are commercially provided by Bayer Corp. Generally, the polyurethane resins provided by Bayer are sold under the trademark, Dispercoll. Three particular polyurethane resins which are suitable in the composition according to the present invention are Dispercoll U KA 848 1, Dispercoll DC 53, and Dispercoll DC 54. These polyurethane resins may be used in the composition either alone, as the only polyurethane resin, or in combination with each other or other polyurethane resins. The Dispercoll polyurethane resins already include water, and are provided commercially as a polyurethane dispersion having from 40–50% polyurethane. Thus, where a polyurethane dispersion, such as Dispercoll, is used, the water content of the dispersion should be taken into account in determining overall water content of the composition. Of course, other suitable polyurethane resins would work in the present invention.

The Dispercoll polyurethane resins, as well as other preferred resins, possess certain physical properties. The tensile strength of preferred polyurethane resins ranges from 2000–5000 psi. The percent elongation of the preferred polyurethane resins ranges from 400–700%. The preferred polyurethane resins also demonstrate a modulus (at 100% elongation) of 300–500 psi. These physical properties and their meanings are well known to those skilled in the art.

Exemplary pigments are available commercially under the trademark Hostafine. These particular pigments are provided in aqueous solution with propylene glycol and contain approximately 30–40% pigment. There are a variety of color pigments sold under the mark Hostafine, and one skilled in the art can blend them, or any other suitable pigment, to obtain virtually any color desired. Pigment selection can also depend upon the intended delivery system, and one skilled in the art can select the appropriate pigment based on the known intended delivery.

Suitable surfactants, especially fluorosurfactants, are optionally present in the composition of the present invention to maintain flowability and good coverage of the surface to which the composition is applied. One suitable surfactant is sold under the trademark Fluorad. Fluorad FC-120 contains approximately 38% water. Of course, other suitable surfactants could also be used.

The composition of the present invention may also optionally include one or more anti-microbial preservatives. The anti-microbial preservative may be added to counter the formation or growth of fungi, bacterias, yeasts, or molds. Over time, these detrimental components can form in the composition, particularly in the case where the composition is present on a marker tip or some other nib that allows air to easily contact the composition. Exemplary anti-microbial preservatives would include Proxel, sold by Avecia, and Troysan, sold by Troy Chemical Company of New Jersey. Any suitable anti-microbial preservative could, of course, be used. When used, the preferred amount of anti-microbial preservative is from 0–0.5% by weight, and a more preferred amount is from 0.10–0.40% by weight.

The present invention also includes markers and other application instruments, such as ball point pens. Such application instruments which are used to apply the composition of the present invention would include an outer body having a first end, an applicator at the first end of the outer body, and a reservoir included within the outer body and in fluid communication with the applicator. The application instruments of the present invention would contain in their reservoirs a water-based, erasable marking composition in accordance with the present invention disclosed above.

The applicator itself could be any of a number of forms of known writing nibs, such as a ball or a piece of felt. The applicator could also include the nozzle of a sprayer or the bristles of a brush.

Although the present invention has been particularly described in conjunction with specific preferred embodiments, it is evident that many alternatives, modifications, and variations will be apparent to those skilled in the art. It is therefore contemplated that the appended claims will embrace any such alternatives, modifications, and variations as falling within the true scope and spirit of the present invention.

What is claimed is:

1. A water-based, erasable marking composition for use on paper comprising:
   13–69% by weight water;
   5–15% by weight glycerin;
   0.3–6% by weight pigment; and
   greater than 30% to 42.5% by weight polyurethane.

2. The erasable composition of claim 1, further comprising a surfactant.

3. The erasable composition of claim 2, wherein said surfactant is a fluorosurfactant present at 0–1% by weight.

4. The erasable composition of claim 1, further comprising 0–0.5% by weight anti-microbial preservative.

5. The erasable marking composition of claim 1 wherein the composition has an erasability of greater than 50%.

6. A water-based, erasable marking composition comprising:
   52% by weight water;
   9% by weight glycerin;
   4% by weight pigment; and
   35% by weight polyurethane.

7. The erasable composition of claim 6, further comprising a surfactant.

8. The erasable composition of claim 7, wherein said surfactant is a fluorosurfactant present at 0.002–0.375% by weight.

9. The erasable composition of claim 6, further comprising 0.05–0.15% by weight anti-microbial preservative.

10. An application instrument for applying an ink to paper comprising:
    an outer body having a first end;
    an applicator at said first end of said outer body;
    a reservoir included within said outer body and in fluid communication with said applicator; and
    a water-based, erasable marking composition within said reservoir, said water-based, erasable marking composition comprising:
    13–69% by weight water;
    0.3–6% by weight pigment;
    5–15% by weight glycerin; and
    greater than 30% to 42.5% by weight polyurethane.

11. The application instrument of claim 10, wherein said water-based, erasable marking composition further comprises a surfactant.

12. The application instrument of claim 11, wherein said surfactant is a fluorosurfactant present at 0–1% by weight.

13. The application instrument of claim 10, wherein said water-based, erasable marking composition comprises:
    52% by weight water;
    9% by weight glycerin;
    4% by weight pigment; and
    35% by weight polyurethane.

14. The application instrument of claim 10, further comprising 0.05–0.15% by weight anti-microbial preservative.

* * * * *

UNITED STATES PATENT AND TRADEMARK OFFICE
CERTIFICATE OF CORRECTION

PATENT NO. : 6,344,498 B1
DATED : February 5, 2002
INVENTOR(S) : Keith J. Allison and Richard J. Kaiser It is certified that error appears in the above-identified patent and that said Letters Patent is hereby corrected as shown below:

<u>Column 10,</u>
Line 13, after "composition" insert -- for use on paper --.

Signed and Sealed this

Fifteenth Day of October, 2002

*Attest:*

*Attesting Officer*

JAMES E. ROGAN
*Director of the United States Patent and Trademark Office*